(12) United States Patent
Kuijt et al.

(10) Patent No.: US 9,327,431 B2
(45) Date of Patent: May 3, 2016

(54) APPARATUS FOR ROTATIONAL MOLDING OF PLASTIC MATERIAL

(71) Applicant: AMS BELGIUM, Bilzen (BE)

(72) Inventors: Johan Kuijt, Holten (NL); Bernhard Kuijt, Holten (NL); Frank Harleman, Hengelo (NL); Filip Claus, Noorderwijk-Herentals (BE); Johan Potargent, Bilzen (BE)

(73) Assignee: AMS BELGIUM, Bilzen (BE)

( * ) Notice: Subject to any disclaimer, the term of this patent is extended or adjusted under 35 U.S.C. 154(b) by 0 days.

(21) Appl. No.: 14/397,846

(22) PCT Filed: Apr. 30, 2013

(86) PCT No.: PCT/IB2013/053414
§ 371 (c)(1),
(2) Date: Oct. 29, 2014

(87) PCT Pub. No.: WO2013/164765
PCT Pub. Date: Nov. 7, 2013

(65) Prior Publication Data
US 2015/0118341 A1    Apr. 30, 2015

(30) Foreign Application Priority Data

Apr. 30, 2012  (BE) .................................. 2012/0288
Jan. 25, 2013  (NL) .................................... 2010182

(51) Int. Cl.
*B29C 41/38*    (2006.01)
*B29C 41/52*    (2006.01)
*B29C 33/02*    (2006.01)
(Continued)

(52) U.S. Cl.
CPC ................. *B29C 41/52* (2013.01); *B29C 33/02* (2013.01); *B29C 41/06* (2013.01); *B29C 41/34* (2013.01); *B29C 41/38* (2013.01); *B29C 41/46* (2013.01)

(58) Field of Classification Search
USPC .................................................. 425/435, 429
See application file for complete search history.

(56) References Cited

U.S. PATENT DOCUMENTS 3,510,911 A * 5/1970 Alter .............................. 425/435
4,129,282 A * 12/1978 Scott et al. ..................... 425/429
(Continued)

FOREIGN PATENT DOCUMENTS

EP           1649997 A1    4/2006
WO    WO 2006/103179 A1   10/2006
WO    WO 2009/057162 A1    5/2009

OTHER PUBLICATIONS

International Search Report (PCT/ISA/210) for PCT/IB2013/053414 mailed Dec. 10, 2013.
(Continued)

*Primary Examiner* — Tim Heitbrink
(74) *Attorney, Agent, or Firm* — Koppel, Patrick, Heybl & Philpott

(57) ABSTRACT

This invention relates to a device for rotational molding. The device comprises a mold which is movably arranged, having a mold wall, surrounded by a mold cavity and a material feeding device for feeding the curable raw material into the mold cavity. The mold is movably mounted on a robot arm, associated with the mold. The movement of the mold is controlled by a control device communicating with the robot arm. The mold is provided with a device for controlling the temperature of the mold and which is integrally formed with the mold.

22 Claims, 2 Drawing Sheets

(51) Int. Cl.
  *B29C 41/06* (2006.01)
  *B29C 41/34* (2006.01)
  *B29C 41/46* (2006.01)

(56) References Cited

U.S. PATENT DOCUMENTS

| | | | | |
|---|---|---|---|---|
| 5,188,845 A | * | 2/1993 | Payne | 425/435 |
| 5,316,701 A | * | 5/1994 | Payne | 425/435 |
| 5,503,780 A | * | 4/1996 | Payne | 425/429 |
| 6,511,619 B1 | * | 1/2003 | Payne | 425/429 |
| 6,555,037 B1 | * | 4/2003 | Payne | 425/435 |
| 7,273,364 B2 | * | 9/2007 | Laws et al. | 425/578 |
| 8,628,704 B2 | * | 1/2014 | Pop-Iliev et al. | 425/429 |
| 2007/0063370 A1 | | 3/2007 | Steinberger | |

OTHER PUBLICATIONS

N.N.: 11 Crescent Kayak Splash Frequently Asked Questions; Sep. 30, 2002. pp. 1-1. XP002681519. Retrieved from the Internet: URL:http://www.shortypen.comjboatsjkayakjcrescent-splash-kayak-info/ [retrieved on Aug. 8, 2012], paragraph [0008] & "Google. publication date of http://www.shortypen.comjboatsj kayakjcrescent-splash-kayak-info/", Aug. 8, 2012. XP002681520. URL:http://www.google.dejsearch?q=http%3A%2F%2Fwww. shortypen.com%2Fboats%2Fkayak%2Fcrescent-splash-kayak-info%2F&h1=en&biw=1384&bih=677&prmdo=1&sa=X&ei= V48iUM6WE8PNtAapviHQBw&ved=OCAkQpwUoBg&source= 1nt&tbs=cdr%3A1%2Ccdmin%3A%2Ccdmax%3A30.04.2012& tbm=[retrieved on Aug. 8, 2012].

* cited by examiner

APPARATUS FOR ROTATIONAL MOLDING OF PLASTIC MATERIAL

BACKGROUND OF THE INVENTION

1. Field of the Invention

The present invention concerns a device for rotational moulding for the production of an object, manufactured of a material containing a curable raw material, wherein the device comprises a mould which is movably arranged, having a mould wall, surrounded by a mould cavity and a material feeding device for feeding the curable raw material into the mould cavity, according to the first claim.

2. Description of the Related Art

In the production of large numbers of the same form of plastic, often use is made of techniques such as blow moulding, and injection moulding by extrusion of a plastic in a mould. Another much used technique for the manufacture of the skin of tension-free hollow objects in smaller numbers is rotational moulding. Rotational moulding offers the possibility to produce hollow shapes, the skin of which consists of one or more layers that are build up of different materials, for example a lower layer in plastic and a upper layer in a finishing material, for example pieces of glass, or objects of which the skin thickness should be locally different. In known techniques for rotational moulding of plastic, a mould is filled with an amount of plastic, after which the mould is placed in an oven for heating and melting of the plastic. Once the plastic has melted, the mould will be rotated and optionally agitated to obtain the desired distribution of the molten plastic in the mould. Subsequently, the mould is cooled and the object is demoulded. A skin that contains two or more layers is often produced using a hopper or dropbox connected mould, the hopper containing the raw material for the production of the second layer. Although mould and dropbox are thermally insulated, the connection between the two may give rise to a large number of rejected products. Rotational moulding can be a cumbersome technique when working with multiple moulds and dropboxes. Other disadvantages of the technique of rotational moulding are a high energy consumption when using indirectly heated moulds wherein the moulds, for example, are heated by placing them in an oven, unsafe conditions, when directly heating with a flame and limited automation and process control capabilities.

WO2006/103179 in the name of Krauss Maffei discloses a device for slush-moulding or pour moulding, as well as a method for the manufacturing of a plastic skin for a hollow object. The device contains a mould for shaping the plastic skin, mounted on a centrally arranged robot arm. According to a first embodiment, the mould can be attached to a container with a plastic material stock. According to an alternative embodiment, the plastic container and the mould are mounted on separate robot arms and they are coupled to allow dosage of plastic to the mould. A heating device is arranged in such a way that it can receive the empty mould for the indirect heating of the mould. The use of an indirect heating of the mould requires that the mould as well as the peripheral (hydraulic) components are temperature resistant. The robot arm is provided for the displacement of the mould to the inner space of the oven for heating of the mould, and from there to the plastic material feeding device for forming a link for the feeding of plastic from the plastic material feeding device to the mould. The link with the heated mould brings along a risk of clogging of the compound in case of poor insulation. The filled heated mould is subjected together with the plastic material feeding device to rotation, shaking and pivoting movement to form the object. Thereafter, the mould and the plastic material feeding device are separated and led to a heating oven for the gelling of the plastic. This heating of the mould and plastic in two steps is time consuming and disadvantageous for the quality of the final product. After the second heating step, the mould is moved to a cooling device and from there to a removal station for the removal of the plastic object from the mould. It is possible to disconnect the mould from the robot during the gelling and cooling step, allowing the robot to be accessible for the manipulation of other moulds. Plastic material feeding device, oven, cooling device and removal station are mounted on a circular orbit around the robot. Further disadvantages of these known devices are that the mould has to be moved from one station to the other in order to run through all the cycle steps of filling, heating, cooling and removing the plastic skin. If used with multiple moulds, the total cycle time for running through all steps is therefore determined by the cycle time of the slowest mould.

A similar carrousel system with different stations but then for rotational moulding is, for example, also disclosed in XP002681519.

US2007/0063370A1 discloses a device for rotational moulding that aims to replace such carrousel systems with different stations. However, US2007/0063370A1 also has the disadvantage that the mould cannot yet be sufficiently simultaneously subjected to a temperature-time program during a plurality of operations, movements, and a displacement course. For the feeding of curable raw material to the mould, the temperature-time program still has to be interrupted to perform an additional operation with the aid of a robot arm to a feeding device. This has as a consequence that, if several material layers are desired in the object to be produced, still an insufficient control over the temperature-time program is obtained.

EP1.649.997 in the name of Persico SpA discloses a device for rotational moulding, wherein the wall of the mould comprises integrated flow channels for a hot or cold liquid, respectively, for heating and cooling of the mould.

Consequently, there is a need for a device that is suitable for rotational moulding, that offers the possibility of producing an object, that may contain a plurality of material layers that are superimposed upon each other in such a way that a final product can be provided that is build up of a raw material combination that is difficult to achieve with existing techniques. Furthermore, there exists a need for a device for producing large amounts of the same object with an increased production capacity.

SUMMARY

Therefore, an object of this invention is to provide a device with which a higher production capacity can be obtained for the production of large amounts of an object using rotational moulding, preferably a hollow object with a skin.

According to the invention, this is achieved by a device that displays the technical features of the characterizing part of the first claim.

To this end, the device of this invention is characterized in that the mould is movably mounted on a robot arm, associated with the mould, wherein the movement of the mould is controlled by a control device communicating with the robot arm, and in that the mould is provided with a device for the controlling the temperature of the mould and which is integrally formed with the mould.

By forming the device for controlling the temperature integrally with the mould and by movably mounting the mould on a robot arm associated with the mould, it is possible to simultaneously expose the mould to a temperature-time program and to a plurality of operations, movements and a displacement course. Thus it is possible to realize an important time-saving by simultaneously heating the material for forming the object and distributing it within the mould for the forming the object. The control unit ensures that the desired temperature-time program is followed through by the mould in combination with the desired displacement and movement of the mould, and benefits the reproducibility of the production process. The improved process controlling capabilities result in objects with a reproducible quality, reproducible mechanical properties and a reduced number of rejected pieces.

DETAILED DESCRIPTION

Figure 1:
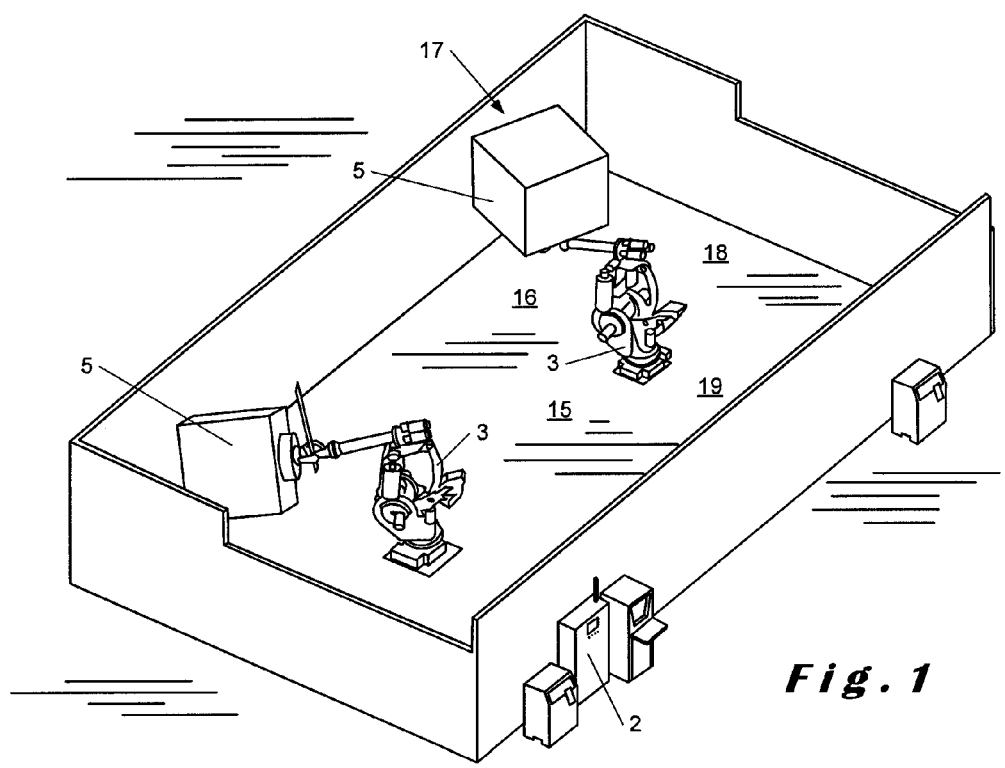
FIG. 1 shows a device according to the invention that contains a plurality of moulds.
Figure 2:
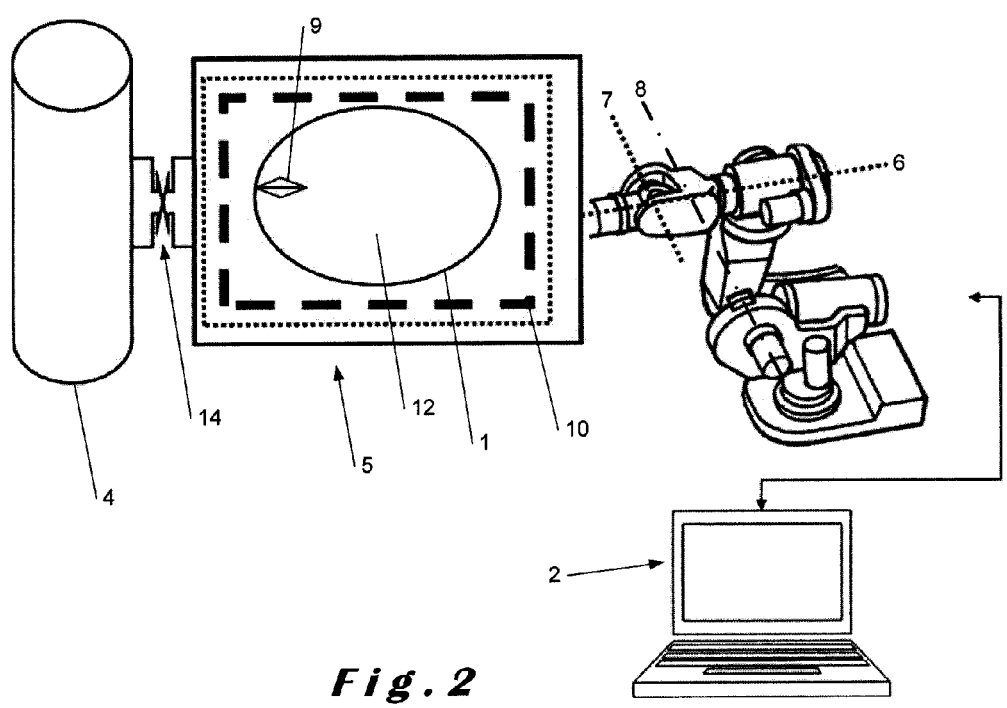
FIG. 2 shows a device according to another embodiment of the invention.

Because the mould is mounted on a robot arm, associated with the mould, it is possible to make every mould run its own program, independently of other moulds that are present in the device. This creates the possibility to simultaneously produce multiple objects, making use of the same or different raw materials, and have the individual moulds run an individual temperature-time program and a motion-time program. The mounting of the mould on a robot arm, associated with the mould, thus promotes the individual manipulability of each mould.

Forming the mould integrally with the device for controlling the temperature of the mould, enables a faster and more optimal heat transfer to the mould wall and to the raw materials that are present in the mould. Hence, the cycle time, necessary for producing the object, can be shortened and loss of heat can be reduced. Implementation of the temperature control device integrally with the mould improves the accessibility of the mould in comparison with a mould that is placed in an external oven and enables that additional manipulation of the mould, for example filling it with curable raw material such as plastic, can be performed to the mould in situ, as well as the addition of extra materials, for example for the acquisition of a decorative or technical effect. Operations such as a displacement of the mould to the oven and further to a position in the oven, the opening and closing of the oven, become superfluous, such that not only time can be saved but also the energy efficiency of the process can be improved.

Implementation of the temperature control device integrally with the mould can be realized by different methods, well-known by those skilled in the art, for example by integrating the device into the wall of the mould or by mounting the device onto an outer side of the mould wall or onto an inner side or by integrating it into an inner side. The method of mounting shall be chosen by those skilled in the art taking into account the nature of the heating and cooling device.

Preferably, the mould further includes an inner space wherein the temperature sensor is provided for measuring the temperature in the inner space of the mould, to enable a process control that is based on the actual temperature in the mould space, that is representative for the actual physical condition of the plastic. The inventors have determined that such process control, based on the actual temperature in the mould space, allows for a better process control, benefits the reproducibility of the process and results in hollow objects with a skin with reproducible quality, reproducible mechanical properties and a reduced amount of rejected pieces. This is in contrast to the devices that are known in the present state of the art making use of a predetermined temperature-time regime assuming that the plastic will have reached a certain temperature after a certain heating period at a certain power level, without taking into account the temperature of the environment and the actual control or settings of the device.

According to a preferred embodiment, the mould is movably arranged relative to the robot arm. More preferably, the movement of the mould relative to the robot arm is controlled by the robot arm or the control unit or a combination thereof. The object is to improve the mobility of the mould and to limit the movements to which the robot arm is subjected.

Preferably, the matrix is movable by means of the robot arm between one or more of the following positions: a position for filling the mould with curable raw material, a position for subjecting the mould to one or more temperature-time courses, a position for subjecting the mould to one or more movements, and a position for demoulding the object formed in the mould. This offers the possibility that each mould can run its own course, independently of other moulds that may be present in the device.

The device of this invention is suitable for the production of full objects, hollow objects, or a skin for hollow objects, in a variety of materials. The objects can be composed of one layer of the same material, or of two or more layers of the same material or different materials, wherein at least one layer is formed of a curable raw material, such as for example plastic, for example a thermoplastic material, metal, nutrients, for example meltable fats such as butter and margarine, meltable fats containing compositions such as for example creams for cookies or chocolate, or any other raw material that can be formed by means of rotational moulding. The second layer and all other layers can be moulded from a second curable raw material that is the same or different from the first curable raw material from which the first layer is manufactured. The second layer may also be manufactured of another raw material that forms a good bond or connection with the raw material of the first layer, for example if decorative effects are contemplated.

The invention will further be explained on the basis of the figures and detailed descriptions below.

FIG. 1 shows a device according to the invention that contains a plurality of moulds.

The device, shown in FIG. 1, comprises a control unit or robot 2, onto which one or more robot arms 3 are arranged, controllable by the control unit 2. The end of one or more robot arms 3 carries a mould 5 for forming an object out of a curable raw material. However, a robot arm may also carry two or more moulds. The mould 5 is movably arranged relative to the robot arm 3, the control unit 2 or a combination thereof.

In the following, curable raw material shall refer to plastic. It should, however, be clear that curable raw material refers to thermoplastic materials, thermosetting resins, metal, chocolate, fat or any other material that can be shaped or applied using rotational moulding.

The device may contain one feeding device 4 for feeding a first material that contains a first plastic to the mould cavity of one or more moulds for forming an object. The device may contain two or more raw material feeding devices, the first feeding device being provided for feeding a first mould with a first raw material, and a second feeding device provided for feeding a second mould with a second material. Alternatively, a first feeding device may be provided for feeding a first mould and forming a first material layer for forming a first layer of the object, and a second feeding device for forming a second layer of the object. If desired, other material feeding devices may be provided.

The mould may be provided with an opening 14 for supplying gas to the mould and for evacuating gas from the mould, wherein said opening 14 is also provided for dosing the raw material to the mould to form the skin of the object.

The mould is preferably rotationally mounted on the robot arm 3. In addition, the mould 5 is preferably rotationally positioned about a first axis 6 to allow the production of hollow objects. An improved uniformity of the wall thickness of the object can be obtained by rotationally positioning the mould about a first 6 and a second axis 7. Rotation about a first and second axis can also be chosen to locally vary the wall thickness of the hollow object. Herein, the second axis 7 is preferably positioned at a second angle relative to the first axis 6, for example at an angle of 90°, however, any other angle can suitably be used if the application requires so. Preferably, the angle of the first and second axis are adjustable. Preferably, the speed with which the mould rotates about the first 6 and second axis 7 is individually adjustable. Preferably, the rotation speed about the first axis 6 is adjustable independently from the rotation speed about the second axis 7 and vice versa. The controlling of the rotation movement of the mould, as previously described above, can take place directly using the robot arm 3, associated with the mould 5, or indirectly using the control unit 2 that transmits a corresponding signal to the robot arm 3, associated with the mould 5, that subsequently controls the movement of the mould 5. Under control means setting the rotation direction, the rotation angle, the rotation speed and any other parameter that influences the rotation.

Instead of or additionally to rotationally positioning the mould about a first and second axis, it may be desired to rotationally position the mould abound a first axis 6 and tiltable relative to a third axis 8. The speed or tilt frequency with which the mould 5 is tilted relative to the third axis 8, is preferably individually adjustable for every mould, as well as the angle at which the mould is tiltable and any other parameter that influences the tilt movement. Controlling the tilt movement of the mould 5 can take place directly using the robot arm 3, or indirectly using the control unit that transmits a corresponding signal to the robot arm 3, that subsequently controls the movement of the mould. Preferably, the control unit is also provided for controlling the amount of plastic that is dosed to the mould and feeding the plastic to the mould cavity 12. Dosing may be controlled volumetrically or gravimetrically.

Preferably, the mould 5 is movable between two or more of the following positions: a filling position 15 for filling the mould, a heating position 16 for heating the mould, a forming position 17 for forming the object wherein the mould rotates abound one or more axes and/or is tilted, a cooling position 18 for cooling the mould, a demoulding position 19 for demoulding the object. Two or more of the previously mentioned positions may coincide. For example, the heating position 16 and the rotation position 17 may coincide. For example, also the cooling position 18 may coincide with the previously mentioned positions 16, 17. Moving the mould between these positions is preferably implemented by moving the robot arm 3 in such a way that the mould 5 performs the desired movement. This implies that the robot arm 3 is movably arranged. The movement of the robot arm 3 may be controlled by a control unit that is present in the robot arm 3. The movement of the robot arm may also be controlled by the control unit 2 that is provided to communicate with the robot arm 3 for controlling the movement. A combination of both is also possible.

The mould 3 and the plastic feeding device 4 are preferably movably arranged relative to one another, more preferably, the mould 3 is movable from and to the plastic feeding device 4 by means of the robot arm on which the mould is positioned. In case the device contains multiple material feeding devices, the robot is provided to control the displacement of the mould 3 to the desired feeding device 4. Such a device offers a variety of advantages compared to the known device, wherein a device for receiving plastic is connected with the heated mould. Although these are thermally isolated from each other, there is still a risk that the plastic in the plastic feeding device partly melts and clogs the supply to the mould. Furthermore, the connection between the mould and the plastic feeding device also makes it difficult to obtain access to and the opening of the mould, increases the cycle time considering the plastic is dosed in multiple dosages through a closable valve to the mould. Moreover, there is a serious risk of heat transfer from the mould, which may cause the plastic in the material feeding device to melt. In the device of this invention, the raw material feeding device remains accessible for other moulds, furthermore it is possible to heat or cool the mould or to subject the mould to rotation or any other movement or to execute every other operation, during the displacement of the material feeding device 4 to another position.

The control unit is provided to establish a connection between mould 5 and plastic feeding device 4 with a cold mould or a mould of which the temperature is lower than the melting temperature of the plastic. During filling, the mould 5 may also have a temperature that is higher than the melting temperature of the plastic. In that case, preferably, a good thermal isolation is provided between the feeding device 4 and the mould 5 to avoid melting of the plastic in the connection.

Preferably, the control unit 2 is also provided for controlling the amount of plastic that is dosed into the mould 5, the rate at which the dosage takes place and the like. This benefits the reproducibility of the process. In case the object is formed out of a first and a second layer, the robot or the control unit 2 is preferably provided for controlling the amount of first plastic for forming the first layer, the amount of plastic for forming the second layer, as well as the point in time at which the dosing of the material for the second layer is occurring, and the dosage rate. Because the dosing of the material or materials for forming the object is controlled, it is possible to control the mechanical properties of the object and to guarantee a better reproducibility thereof. Because of that, it becomes possible to control the mechanical properties such as strength, impact resistance, tensile strength etc. and to improve and to obtain a higher reproducibility. By controlling the point in time at which the material of the second material is dosed to the mould, it is possible to obtain a better adhesion of both layers and to obtain better mechanical properties.

In the device of this invention, the robot or control unit 2 is provided for controlling a variety of process parameters in the processing of the materials that are dosed to the mould, such as, amongst others, the amount of raw material dosed for forming the skin of the hollow object, the dosing rate, the temperature-time program to which the mould 5 is subjected during the heating and cooling, the time for which the mould 5 is held at a certain temperature, etc. In case multiple materials are dosed to the mould, the robot is capable of controlling the supply of all the materials. These controlling possibilities improve the possibility of automating the process, they provide a better process management and a better reproducibility, with a more consistent product quality that is less depending on the person who controls the process and fewer rejected pieces.

Preferably, the control unit 2 is programmable, by which is meant that the operations the mould is subjected to, are adjustable via the control unit. It is also possible to provide a robot arm 3 that is programmable, by which is meant that the operations the mould is subjected to, are adjustable via the robot arm. A combination of both is also possible.

The mould 5 comprises a mould wall 1 and a device for controlling the temperature of the mould. The device for controlling the temperature of the mould preferably comprises a heating device 10 for heating the mould wall and melting the plastic, present in the mould, wherein the heating device 10 is integrally formed with the mould wall 1. The heating device 10 may be mounted onto the mould wall, for example by providing conduits for the passage of a liquid or gas onto the mould wall, or by providing infrared or induction heating elements onto the mould wall. The heating device may also be integrated into the mould wall, for example, by incorporating conduits for the passage of a fluid or gas in the wall, or electrical resistors or any other heating means into the mould wall. The heating device can also be positioned at a distance from the mould, for example, infra-red cells that are positioned at a distance from the mould wall. Preferably, the heating device is provided for providing a direct heating of the mould wall 1, and is preferably arranged into or onto the mould wall.

Direct heating may be carried out using any technique known to the skilled person, for example by the presence of electrical resistors on the mould wall or incorporated into the mould wall, by induction heating or infrared heating in or on the mould wall, by the presence of channels on or in the mould wall for the passage of a liquid or a vapour at the desired temperature.

By associating each mould with its own temperature control device, each mould may, independently of optionally other moulds, present in the device, run an individual temperature-time cycle without disturbing or adversely affecting the cycle of the other moulds. In particular, by associating each mould with its own temperature control device, each mould can be heated or cooled independently of optionally of other moulds up to a preselected temperature, during a preselected time and according to a preselected temperature-time course. Sequences of heating and cooling may be chosen for each mould independently of the other, taking into account the nature of the raw material or raw materials to be processed and the intended appearance.

The implementation of the temperature control device integrally with the mould also improves the mobility and manipulability of the mould, since manipulation of the mould may take place together with the temperature control device, and the mould should not be removed thereof to provide access to the mould. Furthermore, the displacement of the mould is not hindered by a surrounding casing of, for example, a heating or cooling device in which the mould is located, but the temperature control device and mould may be displaced, moved, and manipulated as a whole, and may be subjected to rotation, shaking or tilting movement.

The control unit is preferably provided to control the heating rate of the mould 3, the temperature up to which the mould is heated and every other temperature-time program to which the mould is subjected. However, this control can also be provided by the robot arm onto which the mould is mounted. In case the device contains multiple moulds, the possibility exists that individual moulds will run an individual temperature-time program.

In case use is made of a liquid or gas as a heating medium, to keep the cycle time as short as possible, the liquid may preferably be supplied from a stock (not shown), for example a liquid bath in which the heating liquid is kept at the desired temperature. It may be decided to keep one heating liquid at one temperature, or it may be decided to keep one heating liquid at multiple temperatures or to keep multiple heating liquids at multiple temperatures. Within the scope of the invention, a variety of heating liquids can be used. However, preferably, use is made of oil or water. Suitable oils are, amongst others, mineral oils and silicones.

The heating is preferably chosen in such a way that the desired raw material may be processed in the mould. For the processing of nutrients such as chocolate and fats, heating, for example of 25-70° C., will suffice. For the processing of plastic or metal, a higher temperature, for example 100-200° C. or higher, or for example 250° to 320° C. may be desired. Metals may demand even higher processing temperatures.

Direct cooling may be implemented using every technique known to those skilled in the art, as described above for bringing about the heating. To keep the cycle time as short as possible, the liquid is preferably supplied from a stock (not shown), for example a liquid bath in which the cooling liquid is maintained at the desired temperature. It may be decided to keep one cooling liquid at one temperature, but it may also be decided to keep one cooling liquid at multiple temperatures or to keep multiple cooling liquids at multiple temperatures. Within the scope of the invention, various cooling liquids may be used. A suitable cooling liquid is water. Suitable gasses for cooling a mould are, for example, liquid nitrogen, solid $CO_2$ which is allowed to expand.

In order to reach an optimal heat transfer, the raw material and the wall thickness of the mould are preferably chosen in such a way that the mould is suitable for use for rotational moulding, such that it allows for the optimal heat exchange between the mould wall and the plastic, present in the mould. On the other hand, the wall thickness of the mould is chosen in such a way that the mould is sufficiently strong to process the intended raw material.

So-called pinholes or air inclusions between the plastic layer and the mould wall, formed during the pressure-less deposition of the molten plastic against the mould wall, are generally not desired because they disrupt the appearance of the object. The risk of such pinholes can be kept to a minimum by controlling the process of melting the plastic, forming the plastic into a hollow object and demoulding the hollow object based on a temperature that approaches the actual temperature of the plastic in the mould as close as possible. To this end, preferably, a temperature sensor 9 is located in the mould cavity for measuring the temperature in the mould cavity 12.

The inventor has found that the plastic in the mould between heating and forming into a hollow object passes through the following stages.

1. In a first stage, the plastic heats up. The temperature, measured by the temperature sensor in the mould cavity, increases evenly. Often, a linear temperature-time relationship is established.

2. In a second stage, the temperature of the mould cavity increases less rapidly and the temperature-time diagram shows a kink. This kink usually indicates that the plastic is melting, at which point the plastic starts sticking to the wall of the mould.

3. In a third stage, the temperature in the mould cavity rapidly increases over time. This stage usually corresponds with a state in which all plastic has melted and the plastic begins to sinter. This stage is important in order to remove so-called pinholes or air inclusions in the plastic, formed at the pressure-less deposition of the plastic against the mould wall. The temperature at which sintering starts, usually corresponds with a maximum internal mould temperature, which is typical for each plastic.

4. After the plastic has been heated for a certain period of time, the plastic will be subjected to cooling. The temperature of the mould cavity shall first increase during a limited time, and will fall afterwards. The temperature decrease is usually evenly, i.e. linear as a function of time, unless a different cooling pattern is followed.

5. At the solidification of the plastic, the temperature of the mould cavity decreases less rapidly and the temperature-time curve shows a kink.

6. Once all the plastic is solidified, the temperature of the mould cavity decreases evenly with time. Cooling is accompanied by shrinkage of the plastic and release of the hollow object from the wall of the mould.

A method for the production of an object using the device described above, usually contains the following steps. The mould 5 that is mounted on the robot arm 3 is displaced by the displacement of the robot arm 3 to the plastic feeding device 4. This displacement may occur under the control of the control unit 2 that communicates with the robot arm or through a control device that is present in the robot arm 3. The control device transmits a signal for establishing a connection between the plastic feeding device 4 and the mould and the dosing of a pre-determined amount of plastic to the mould. The control device transmits a signal for the interruption of the connection, and for subjection the mould 5 to a pre-determined temperature-time program for melting the plastic. Simultaneously with the temperature-time program, the mould can be subjected to a sequence of movements, in particular rotation, tilting, shaking, or vibration movements to achieve an optimum distribution of the plastic over the mould. Moving the mould may be implemented during the heating of the mould and after the mould has reached a pre-determined temperature. It may also be chosen to start the movement of the mould after the mould has reached a pre-determined temperature. This too may be controlled by the control unit 2, by the robot arm 3, or a combination of both. After the mould has completed a time-movement program, the mould is cooled by subjecting the mould to a second temperature-time program. Once the desired cooling has been reached, the mould is opened for the removal of the object. If desired, the object may be kept a while in the mould to make the material stress-free.

The invention claimed is:

1. A device for rotational moulding for the production of an object manufactured of a material containing a curable raw material, wherein the device comprises:
   a mould which is movably arranged, having a mould wall, surrounding a mould cavity, wherein the mould is provided with a temperature control device for controlling the temperature of the mould and which is integrally formed with the mould, wherein
   a material feeding device for feeding the curable raw material into the mould cavity,
   a robot arm, associated with the mould, on which the mould is movably mountable, and
   a control unit communicating with the robot arm and the temperature control device, the control unit being arranged for simultaneously applying a predetermined temperature-time program to the mould by means of the temperature control device and a predetermined motion-time program by means of the robot arm.

2. The device according to claim 1, wherein the temperature control device is integrated into the mould wall, or is mounted onto an inner or outer mould wall.

3. The device according to claim 1, wherein the mould comprises an inner space in which a temperature sensor is provided for measuring the temperature in the inner space of the mould.

4. The device according to claim 1, wherein the mould is movably positioned relative to the robot arm.

5. The device according to claim 1, wherein the robot arm is movable between one or more positions for filling of the mould with a curable raw material, subjecting the mould to one or more temperature-time courses, subjecting the mould to one or more movements, and a position for demoulding the object formed in the mould.

6. The device according to claim 1, wherein the material feeding device and the mould are movably positioned relative to each other.

7. The device according to claim 1, wherein the mould is provided with an opening for supplying gas to the mould and for evacuating gas from the mould, wherein said opening is also provided for dosing the raw material to the mould to form the skin of the object.

8. The device according to claim 1, wherein the mould is rotatably positioned about a first axis.

9. The device according to claim 8, wherein the mould is also rotatable about a second axis, which is positioned at an angle with respect to the first axis.

10. The device according to claim 9, wherein the first and/or second axis is adjustable.

11. The device according to claim 10, wherein the rotational speed of the mould is adjustable.

12. The device according to claim 1, wherein the mould is tiltably positioned with respect to a third axis.

13. The device according to claim 12, wherein the angle at which the mould is tiltable, is adjustable.

14. The device according to claim 13, wherein a tilt frequency of the mould is adjustable.

15. The device according to claim 1, wherein the temperature control device comprises electric resistors in or on the mould wall.

16. The device according to claim 1, wherein a plurality of moulds are present in the device and wherein the control unit is provided with an individual temperature-time program and an individual motion-time program for each mould.

17. A device for manufacturing an object from a material containing a curable raw material by rotational moulding, wherein the device comprises a mould which is provided for being movably arranged on a robot arm, the mould having a mould cavity, a mould wall surrounding the cavity and a temperature control device integrally formed with the mould wall for controlling the temperature of the mould, wherein the robot arm is arranged for moving the mould between the following positions: a heating position at which the mould is heated, a forming position at which the object is formed in the mould while the robot arm rotates the mould about one or more axes, and a cooling position at which the mould is cooled.

18. A device according to claim 17, wherein the robot arm is further arranged for moving the mould to and from a filling position at which a material feeding device is provided for feeding the curable raw material into the mould cavity.

19. A device according to claim 18, wherein a plurality of raw material feeding devices are provided, each for feeding a different curable raw material.

20. A device according to claim 17, wherein the robot arm is further arranged for moving the mould to and from a demoulding position at which the object is removed from the mould.

21. The device according to claim 17, wherein a plurality of moulds are present in the device.

22. The device according to claim 17, further comprising a control unit communicating with the robot arm for controlling the movement of the mould.

* * * * *